(12) United States Patent
Ball et al.

(10) Patent No.: US 11,977,262 B1
(45) Date of Patent: May 7, 2024

(54) FIBER OPTIC ALIGNMENT ASSEMBLY

(71) Applicant: Amazon Technologies, Inc., Seattle, WA (US)

(72) Inventors: Shirley Elizabeth Ball, Greer, SC (US); Kurt Dehut, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 17/545,569

(22) Filed: Dec. 8, 2021

(51) Int. Cl.
*G02B 6/36* (2006.01)
*G02B 6/255* (2006.01)
*G02B 6/38* (2006.01)

(52) U.S. Cl.
CPC ......... *G02B 6/3843* (2013.01); *G02B 6/3885* (2013.01)

(58) Field of Classification Search
CPC .. G02B 6/3843; G02B 6/3885; G02B 6/3839; G02B 6/2553; G02B 6/2555; G02B 6/2556

USPC ................. 385/70–73, 76–78, 80–83, 95–99
See application file for complete search history.

(56) References Cited

U.S. PATENT DOCUMENTS

| 7,349,616 | B1 * | 3/2008 | Castonguay | G02B 6/445 398/67 |
| 2020/0116947 | A1 * | 4/2020 | Drapeau | C08L 83/04 |
| 2022/0283374 | A1 * | 9/2022 | Trnka | G02B 6/2553 |

\* cited by examiner

*Primary Examiner* — Kaveh C Kianni
*Assistant Examiner* — Hung Q Lam
(74) *Attorney, Agent, or Firm* — Kilpatrick Townsend & Stockton LLP

(57) ABSTRACT

A fiber optic alignment assembly can include first and second receivers positioned on a base. The first receiver can include a channel for receiving a collet of a first fiber optic ribbon such that the ferrule of the first fiber optic ribbon is positioned for engagement. The second receiver can include a channel for receiving a collet of a second fiber optic ribbon such that a ferrule of the second fiber optic ribbon is positioned for engagement with the ferrule of the first fiber optic ribbon.

20 Claims, 8 Drawing Sheets

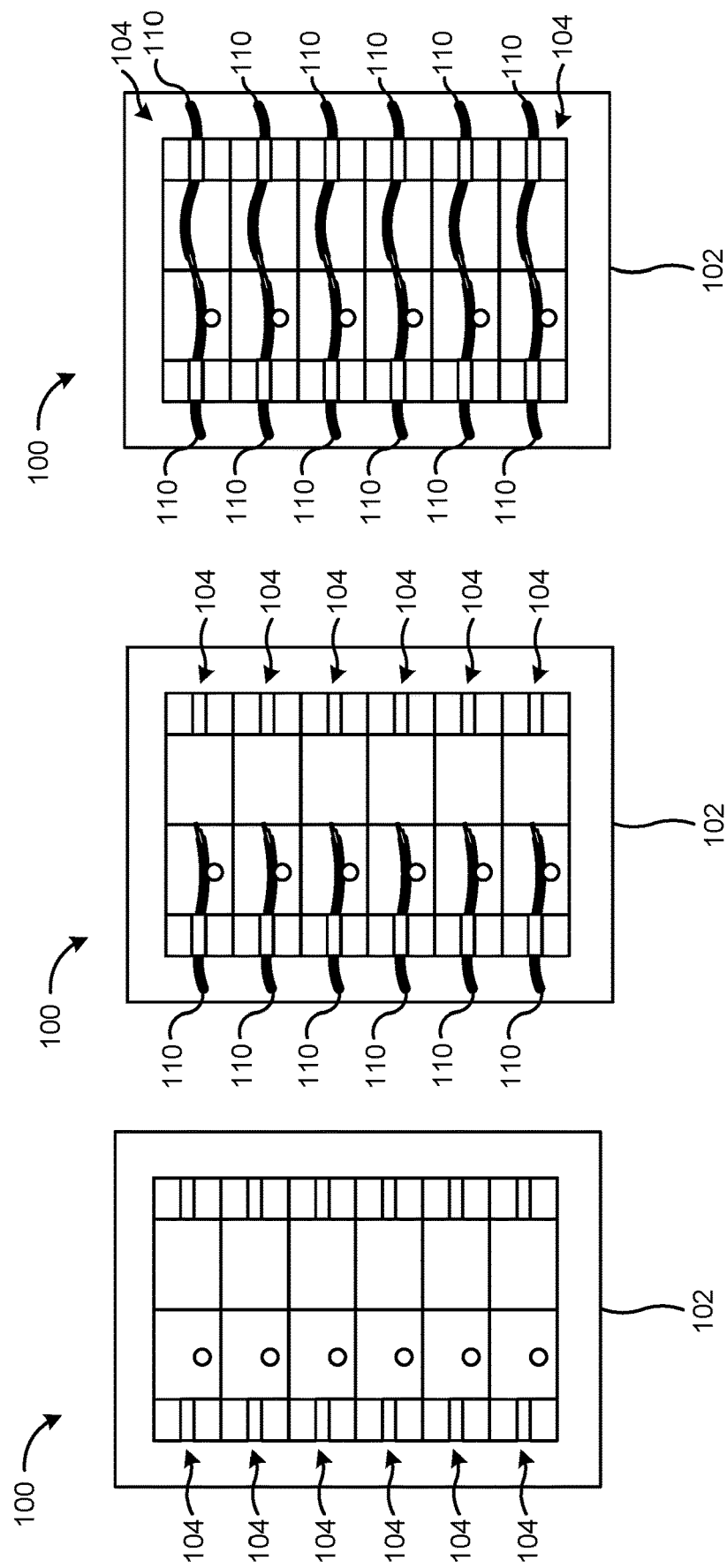

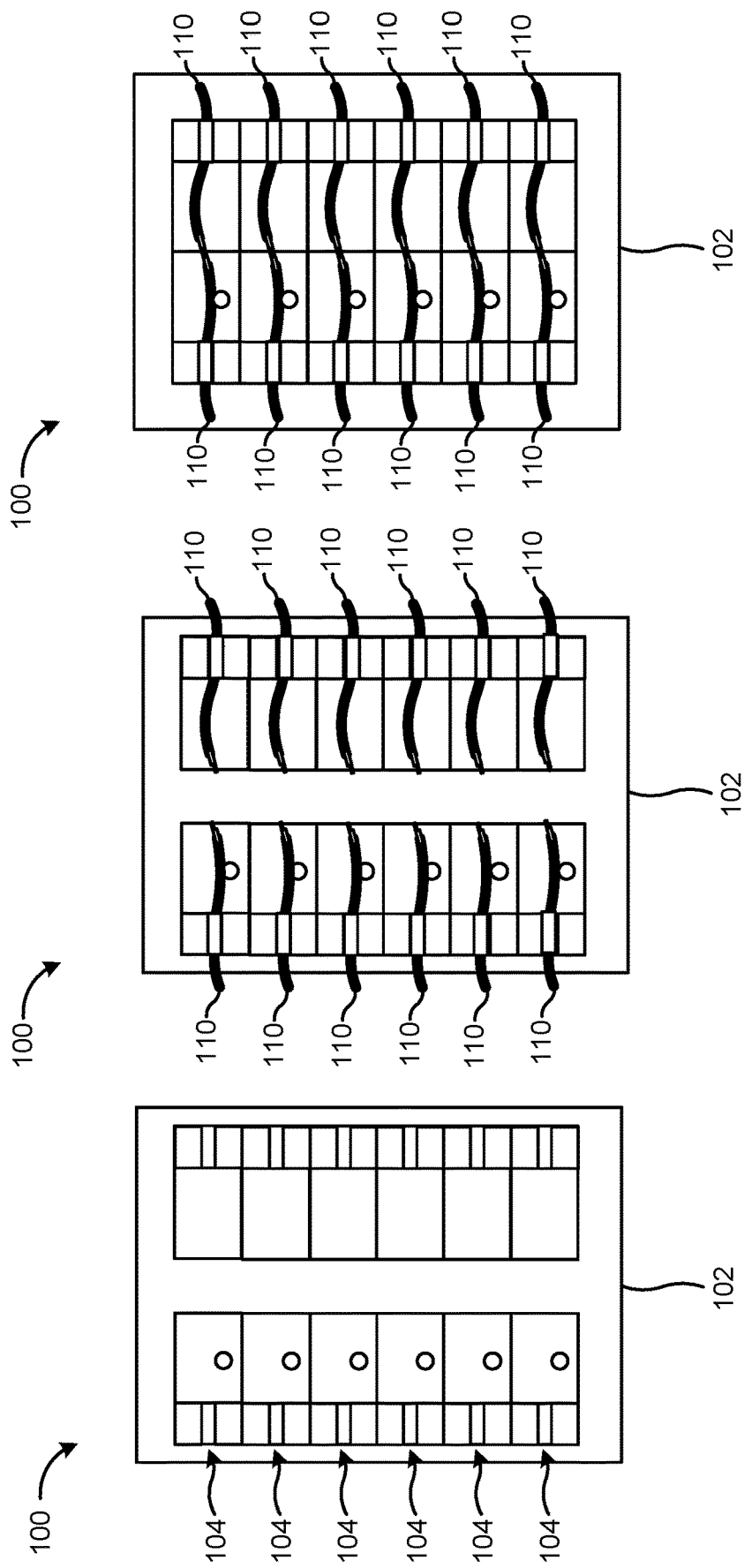

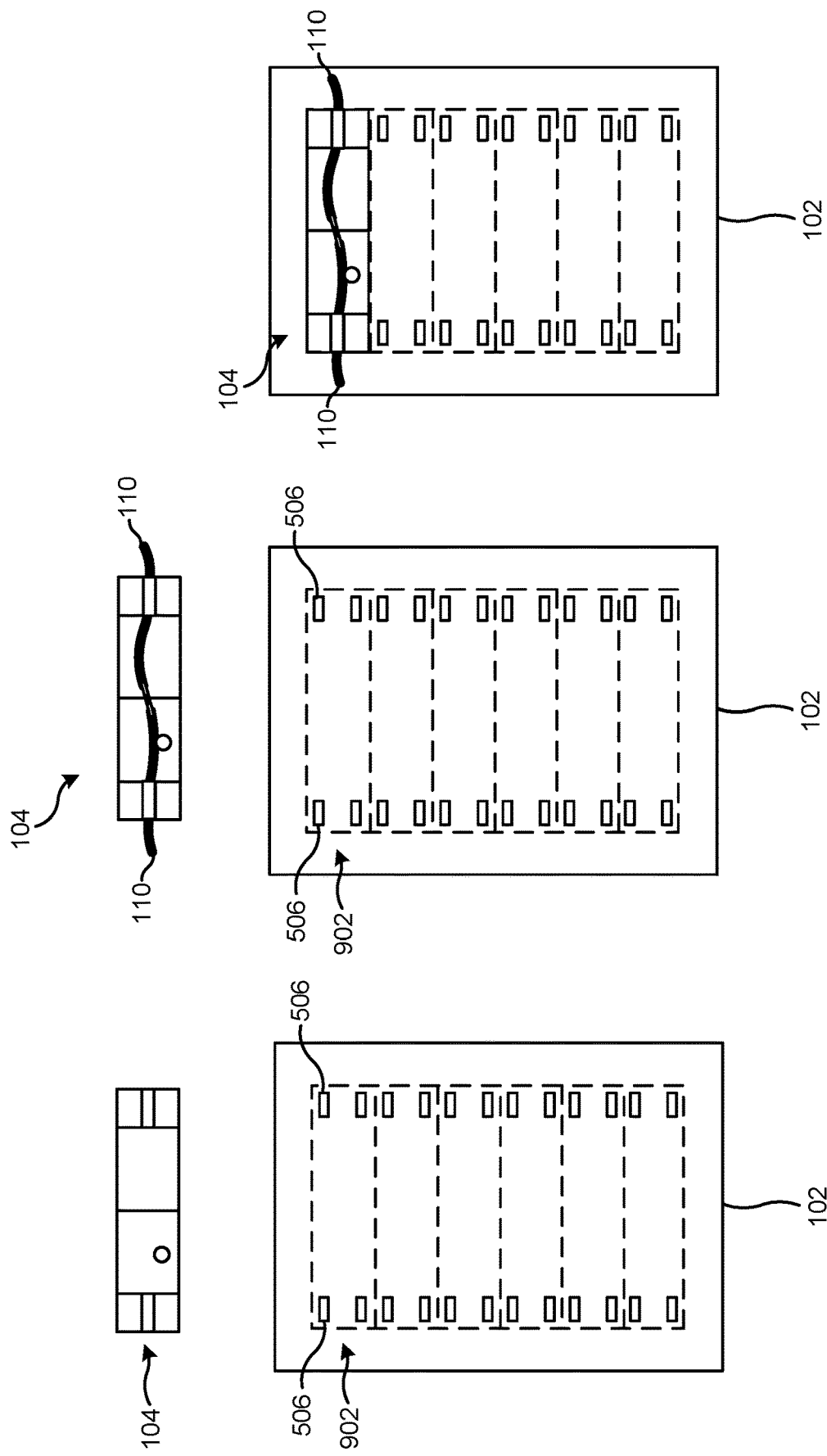

FIBER OPTIC ALIGNMENT ASSEMBLY

BACKGROUND

Datacenters house collections of servers and networking hardware, including switches and routers. Often cables, for example fiber optic cables and/or fiber optic ribbons, are used to connect the components. The cables can be installed by splicing the cables together. However, splicing the cables together can be an expensive and time consuming process that uses specialized tools and equipment. For example, the fiber optic cables and/or fiber optic ribbons may need to be spliced with a splicing tool and tested with testing equipment.

BRIEF DESCRIPTION OF THE DRAWINGS

Various embodiments in accordance with the present disclosure will be described with reference to the drawings, in which:

FIGS. 7A through 7C illustrate various states of components that may be implemented in a simplified example process for connecting fiber optic ribbons using the fiber optic coupling system of FIG. 1, according to various embodiments;

FIGS. 8A through 8C illustrate various states of components that may be implemented in a simplified example process for connecting fiber optic ribbons using the fiber optic coupling system of FIG. 4, according to various embodiments; and FIGS. 9A through 9C illustrate various states of components that may be implemented in a simplified example process for connecting fiber optic ribbons using the fiber optic coupling system of FIG. 5, according to various embodiments.

DETAILED DESCRIPTION

Figure 1:
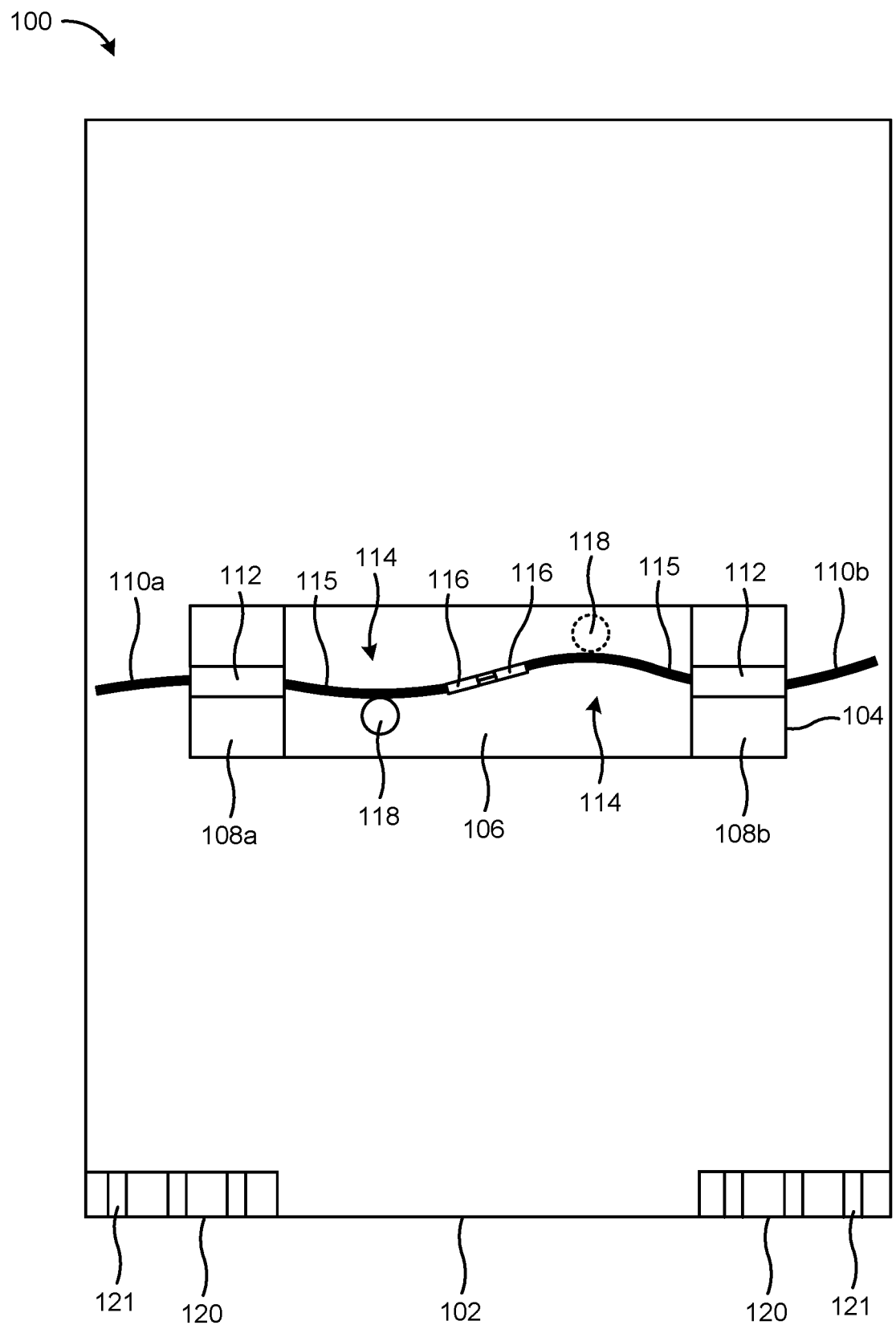
FIG. 1 shows a top view of an example fiber optic coupling system including a splicing tray and a fiber optic alignment assembly, according to various embodiments.

Among other things, examples herein are directed to systems and techniques relating to a fiber optic alignment assembly. The techniques described herein may be implemented by any suitable fiber optic alignment assembly, but particular examples are described that includes receivers connected to a base. Each of the receivers can include a channel for receiving a portion of a fiber optic ribbon. For example, a first receiver can include a channel for receiving a collet attached to a first fiber optic ribbon, and a second receiver can include a channel for receiving a collet attached to a second fiber optic ribbon. The fiber optic ribbons can each include terminal segments extending from the collets. The terminal segments can include ferrules that can be connected when the fiber optic ribbons are positioned in the receivers. Connecting the ferrules can be or include aligning optical interface points in the ferrules such that light is able to travel between the ferrules. However, connecting the ferrules can be or include engaging components of the ferrules to mechanically hold the ferrules together. The receivers can be oriented to align the ferrules when the collets are positioned in the receivers. For example, when the first collet of the first cable is positioned in the first receiver and the second collet of the second cable is positioned in the second receiver, the first and second ferrules of the respective first and second cables can be connected.

Turning now to a particular example, a fiber optic coupling system can include a splice tray and a fiber optic alignment assembly. The splice tray can be positioned in an enclosure in or exterior to a datacenter. The fiber optic alignment assembly can be attached to the splice tray. For example, the fiber optic alignment assembly can include extensions that can be positioned in a groove or recess in the splice tray. The fiber optic alignment assembly can include first and second receivers connected to a base. The first receiver can include a channel for receiving a collet of a first fiber optic ribbon and the second receiver can include a channel for receiving a collet of a second fiber optic ribbon. The first and second fiber optic ribbons can each include terminal segments that extend from the respective collets. The terminal segments can include a set length of fiber optic ribbon that terminates with a ferrule. A guide can be positioned to align the ferrules such that the ferrules can connect the fiber optic ribbons. For example, the guide can be or include a peg or other structure that can position the ferrule of the first fiber optic ribbon for engagement with the ferrule of the second fiber optic ribbon. The ferrules can be connected by positioning the fiber optic ribbons (e.g., the collets) in the receivers. However, the ferrules can be connected by positioning the fiber optic ribbons in the receivers and moving the receivers toward one another.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Turning now to the figures, FIG. 1 illustrates an example fiber optic coupling system 100 including a splice tray 102 and one or more fiber optic alignment assemblies 104. FIG. 1 shows one fiber optic alignment assembly 104, however, multiple fiber optic alignment assemblies 104 can be positioned on the splice tray 102. The fiber optic alignment assemblies 104 can be connected to (e.g., coupled with) the splice tray 102. For example, the fiber optic alignment assemblies 104 can include projections that are positioned in recesses of the splice tray 102 (or vice versa). In some embodiments, the splice tray 102 and the fiber optic alignment assemblies 104 can be a single piece. For example, the splice tray 102 and the fiber optic alignment assembly 104 can be molded as a single piece.

Figure 3A:
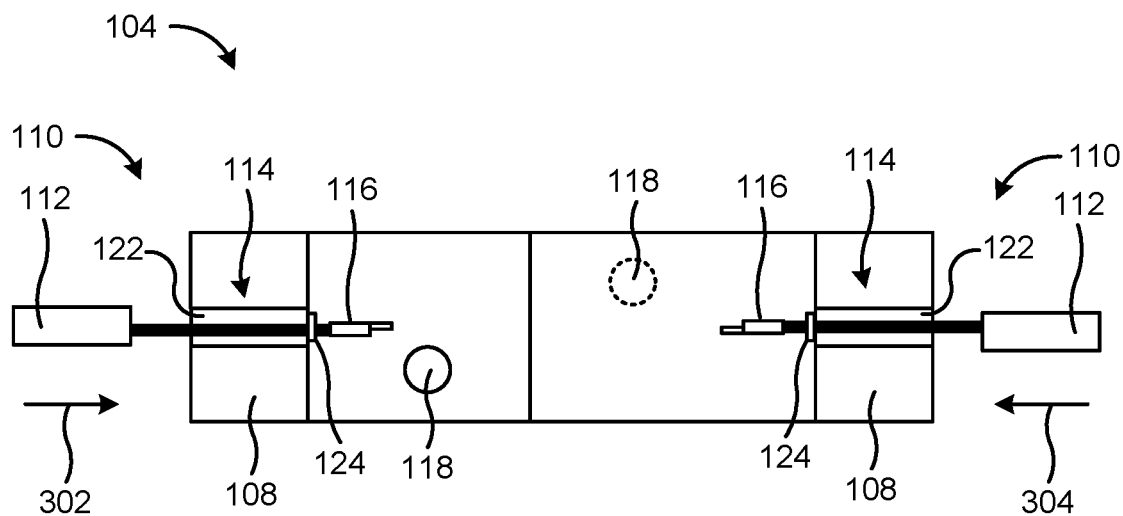
FIGS. 3A and 3B show insertion of a fiber optic ribbon into a fiber optic alignment assembly for use with the fiber optic coupling system of FIG. 1, according to various embodiments.

The fiber optic alignment assembly 104 can include a base 106 and receivers 108. The receivers 108 can receive a portion of fiber optic ribbons 110. For example, a first receiver 108a can receive a first fiber optic ribbon 110a and a second receiver 108b can receive a second fiber optic ribbon 110b. In various embodiments, the fiber optic ribbons 110 can include a collet 112 that can be positioned in the receiver 108. For example, the collet 112 can be positioned in a channel (e.g., channel 122 as shown in FIG. 3A) of the receiver 108. A terminal segment 114 can extend from the collet 112. The terminal segment 114 can include a length of fiber optic ribbon 115 and a ferrule 116. The ferrule 116 can connect with a ferrule 116 of another fiber optic ribbon 110. For example, the ferrules 116 can connect when the collets 112 of the fiber optic ribbons 110 are positioned in the receivers 108.

In various embodiments, the fiber optic alignment assembly 104 can include one or more guides 118. For example, the guide 118 can be positioned at the position shown in solid lines, can be positioned at the position shown in dashed lines, or can be positioned at both positions (e.g., at the position shown in solid lines and the position shown in dashed lines). The guides 118 can position the ferrules 116 such that the ferrules 116 can be connected (e.g., when the fiber optic ribbons 110 are positioned in the receivers 108). For example, the first fiber optic ribbon 110a can be positioned in the receiver 108a with the guide 118 positioning the terminal segment 114 for engagement with the second fiber optic ribbon 110b. The second fiber optic ribbon 110b can be positioned in the receiver 108, and the ferrules 116 can connect. For example, the positioning of the second fiber optic ribbon 110b in the receiver 108 can connect the ferrules 116. However, the receivers 108 may be moved (e.g., toward one another) to connect the ferrules 116. For example, the fiber optic ribbons 110 can be positioned in the receivers 108 and the receivers 108 can be moved toward one another to connect the ferrules 116.

The splice tray 102 can be used to hold and protect individual fiber optic ribbons (e.g., fiber optic ribbons that have been spliced together). The splice tray 102 can include a substantially flat surface that can receive one or more fiber optic alignment assemblies 104. The splice tray 102 can include holders 120 that can hold the fiber optic ribbons 110 in position. For example, the holders 120 can include channels 121 in which the fiber optic ribbons 110 can be positioned. The channels 121 can aid in managing the fiber optic ribbons 110 (e.g., keeping the fiber optic ribbons 110 organized). Additionally or alternatively, the channels 121 can be sized and shaped to hold the fiber optic ribbons 110 in position (e.g., having an opening that is slightly smaller than the diameter of the fiber optic ribbons 110). Holding the fiber optic ribbons 110 in position can reduce the force applied to the collets 112 in the receivers 108 (e.g., can aid in preventing the collets 112 from being pulled out or otherwise removed from the receivers 108). The splice tray 102 can be or include rigid or semi-rigid material (e.g., plastic, metal, carbon fiber, or any suitable rigid or semi-rigid material).

In various embodiments, the splice tray 102 can be positioned in an enclosure. The enclosure can be positioned in a datacenter, however, the enclosure may be positioned outside of a datacenter. For example, the enclosure can receive one or more splice trays 102 and protect the splice trays 102 and the engagement between the fiber optic ribbons 110 (e.g., from debris). The splice trays 102 can be stacked in the enclosure (e.g., on top of one another).

Figure 2:
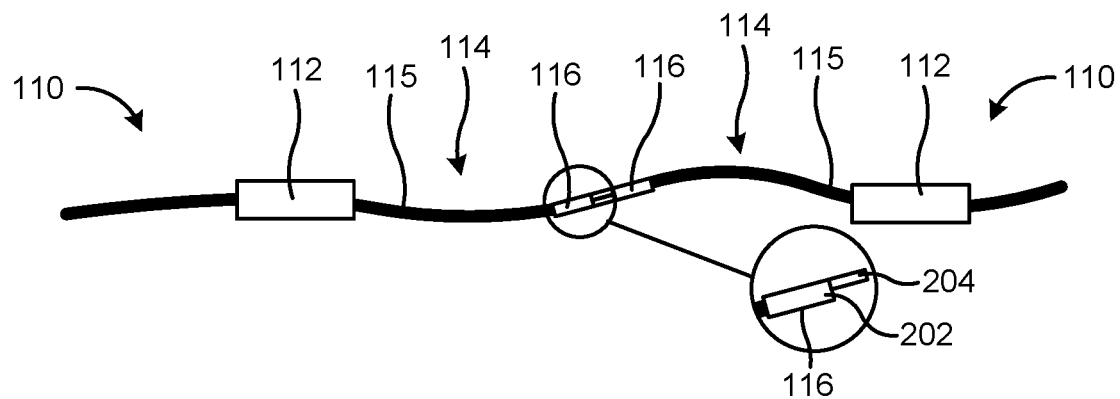
FIG. 2 shows portions of example fiber optic ribbons for use with the fiber optic coupling system of FIG. 1, according to various embodiments.

Turning to FIG. 2, portions of example fiber optic ribbons 110 are shown. The fiber optic ribbons 110 can be or include one or more optical fibers that can be used to carry light. For example, the fiber optic ribbons 110 can be or include one or more raw optical fibers bundled and/or bonded together. The fiber optic ribbons 110 can additionally or alternatively be or include one or more coated optical fibers that are bonded together and/or bundled together. In various embodiments, the optical fibers can be coated with plastic (e.g., individually or combined with one another) and bundled together in a protective cover. In some embodiments, the fiber optic ribbons 110 can be, be included in, or include one or more fiber optic cables.

The fiber optic ribbons 110 can include a collet 112 that can be attached to one or more of the optical fibers. Attaching the collet 112 to the fibers can maintain a set length for the terminal segment 114 (e.g., between the collet 112 and an end of the ferrule 116). For example, attaching the collet 112 to the optical fibers can prevent movement of the fiber optic ribbon 110 relative to the collet 112. Having a set length for the terminal segment 114 can aid in the connecting of the ferrules 116. For example, the set length of the terminal segment 114 can aid in the positioning of the ferrules 116 such that the ferrules 116 can be connected.

The ferrules 116 can be or include a structure attached to the terminated end of the fiber optic ribbon 110 (e.g., to the end of the length of fiber optic ribbon 115). In various embodiments, the ferrules 116 can be or include a precision optical alignment ferrule. The ferrules 116 can allow for light traveling through the fibers to exit the fiber optic ribbons 110. For example, the light can travel from through a first fiber optic ribbon 110 to a first ferrule 116, from the first ferrule 116 to a second ferrule 116, and from the second ferrule 116 through the second fiber optic ribbon 110. The ferrules 116 can be or include one or more lens connectors. For example, the lens connectors can be or include optical interface points and/or right angle lens connectors that can allow the light to travel out of the ferrule 116. Each of the fibers can terminate at an optical interface point. However, multiple fibers can terminate at an optical interface point.

In various embodiments, the ferrules 116 can be sized and shaped to engage with one another (e.g., when the collets 112 are positioned in the receivers 108). For example, the ferrules 116 can include a body 202 and an extension 204. The ferrules 116 can be oriented such that the extensions 204 interlock. The extensions 204 can include optical interface points such that when the extensions are interlocked the optical interface points are aligned and light can travel between the ferrules 116 (e.g., between the optical interface points). The body 202 can be connected to the terminated end of the fiber optic ribbon 110 (e.g., the end of the length of fiber optic ribbon 115).

The ferrules 116 can be held together by a force applied by the fiber optic ribbons 110. For example, the receivers 108 can be separated by a distance such that when the collets 112 are positioned in the receivers 108, the ferrules 116 are held together by a spring force applied by the fiber optic ribbons 110. (e.g., the fiber optic ribbons 110 can be flexible or semi-rigid such that the fiber optic ribbons 110 can bend to apply a spring force to the ferrules 116). The fiber optic ribbons 110 can be positioned (e.g., bent, bowed, or flexed), for example by the guide 118, to apply the spring force to the ferrules 116. For example, the collets 112 can be positioned in the receivers 108 such that when the ferrules 116 are engaged, the fiber optic ribbons 110 are bent and apply a spring force to keep the ferrules 116 engaged. In various embodiments, the fiber optic ribbons 110 and/or the guide 118 can include a separate spring or other biasing mechanism to aid in applying a spring force to keep the ferrules 116 engaged. For example, a spring or biasing mechanism can be positioned adjacent to the ferrules 116 to keep the ferrules 116 engaged.

In some embodiments, the ferrules 116 and/or the fiber optic ribbons 110 may include features for engaging and/or connecting the ferrules 116. For example, semi-rigid protrusions (e.g., arms) can flex to engage with a recess in the body 202.

Figure 3B:
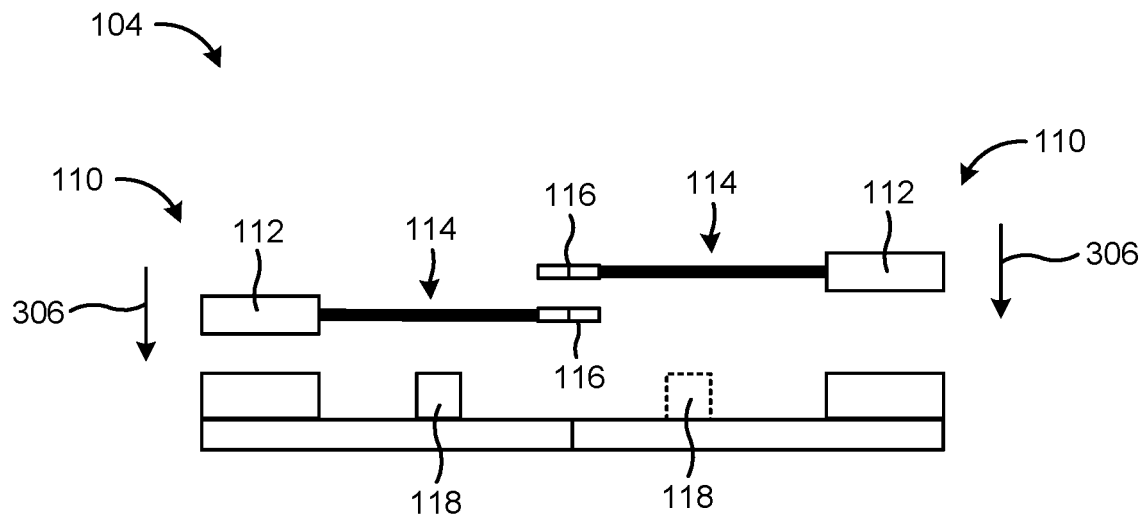

As shown in FIGS. 3A and 3B, the fiber optic ribbons 110 can be inserted into the receivers 108 of the fiber optic alignment assembly 104 (e.g., to connect the ferrules 116). FIG. 3A is a top view of the fiber optic alignment assembly 104 and FIG. 3B is a side view of the fiber optic alignment assembly 104. As shown in FIG. 3A, the fiber optic ribbons 110 can be inserted (e.g., slid) into the receivers 108. For example, the fiber optic ribbons 110 can be moved in a lateral direction (e.g., direction 302 and 304) to insert the collet 112 into a channel 122 of the receivers 108. The fiber optic ribbons 110 can be inserted into the receivers 108 to connect the ferrules 116 (e.g., to reach the state shown in FIG. 1). In various embodiments, the receivers 108 (e.g., the channels 122) can include a stop to stop the insertion of the collets 112 when the collets 112 are correctly positioned in the receivers 108 (e.g., in the channels 122). For example, the channels 122 can include a stop 124 (e.g., a protrusion) that can prevent the collet 112 from being inserted past the correct point (e.g., past the end of the receivers 108). In further embodiments, the stop can hold the collet 112 in position in the channel 122, for example, to prevent the terminal segments 114 from moving and disconnecting the ferrules 116.

As shown in FIG. 3B, the fiber optic ribbons 110 can be inserted into the receivers 108 in a vertical direction (e.g., direction 306). For example, the collets 112 can be inserted into the channels 122 in direction 306. One of the fiber optic ribbons 110 can be inserted into the receiver 108 before the other fiber optic ribbon 110 is inserted into the receiver 108. However, both fiber optic ribbons 110 can be inserted into the respective receivers 108 at substantially the same time. Inserting the fiber optic ribbons 110 into the receivers 108 in vertical direction 306 can connect the ferrules 116. For example, the ferrules 116 can be shaped such that one ferrule 116 can receive a second ferrule 116 that is moving in vertical direction 306.

In various embodiments, the receivers 108 (e.g., the channels 122) can include elements to aid in positioning the collets 112 in the channels 122. For example, the channels 122 can include front and/or back walls such that the collets 112 are correctly positioned in the channels 122. The elements can additionally or alternatively hold the collets 112 in place in the channels 122, for example, to prevent the ferrules 116 from disconnecting.

In some embodiments, a first fiber optic ribbon 110 can be inserted into the receivers 108 along the lateral direction (e.g., direction 302 and 304) and a second fiber optic ribbon 110 can be inserted into the receivers 108 along the vertical direction (e.g., direction 306). For example, a first fiber optic ribbon 110 can be inserted into a first receiver 108 laterally (e.g., in direction 302 and 304) and a second fiber optic ribbon 110 can be inserted into a second receiver 108 vertically (e.g., in direction 306). Additionally or alternatively, a first fiber optic ribbon 110 can be inserted into the receivers 108 along the vertical direction (e.g., direction 306) and a second fiber optic ribbon 110 can be inserted into the receivers 108 along the lateral direction (e.g., direction 302 and 304).

In various embodiments, inserting the fiber optic ribbons 110 into the receivers 108 can cause one or more of the fiber optic ribbons 110 to contact one or more guides 118. For example, inserting the fiber optic ribbon 110 into the receiver 108 (e.g., the collet 112 into the channel 122) can cause a portion of the terminal segment 114 to contact the guide 118. The guide 118 can cause the terminal segment 114 (e.g., the length of fiber optic ribbon 115) to bend and position the ferrule 116 for engagement with the ferrule 116 of another fiber optic ribbon 110. In some embodiments, a second guide 118 can aid in connecting the ferrules 116 of the fiber optic ribbons 110. For example, the first guide 118 can position the first ferrule 116, and the second guide 118 can align the second ferrule 116 with the first ferrule 116 such that the ferrules 116 can connect.

Figure 4:
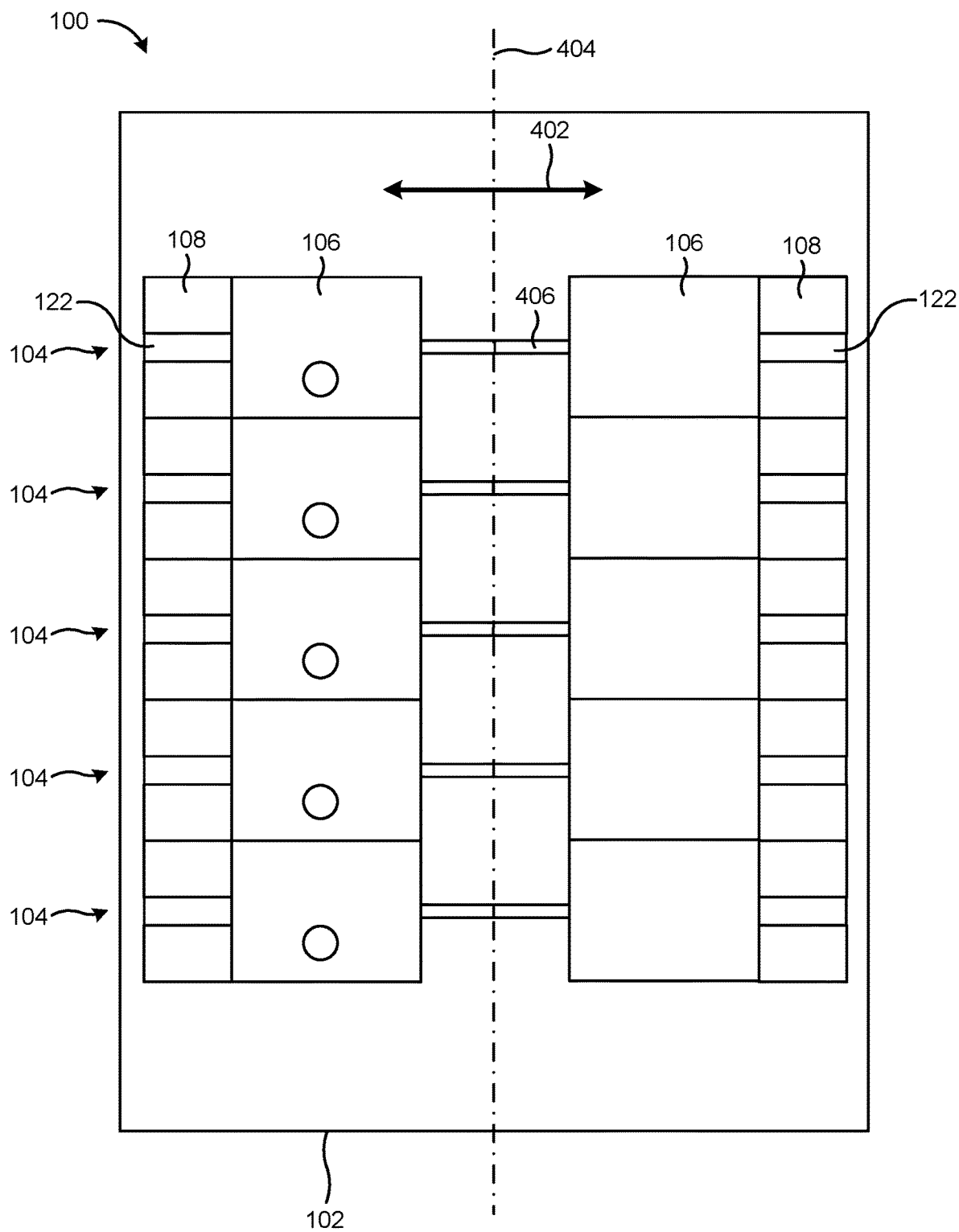
FIG. 4 shows a top view of another example fiber optic coupling system, according to various embodiments.

Turning to FIG. 4, another example fiber optic coupling system 100 is shown. The fiber optic coupling system 100 can include one or more fiber optic alignment assemblies 104 positioned on a splice tray 102. The fiber optic alignment assemblies 104 can include a base 106 with separate portions (e.g., a left portion and a right portion). Each portion can include a receiver 108 for receiving a portion of a fiber optic ribbon 110 (e.g., a collet 112 of a fiber optic ribbon 110). The collet 112 can be positioned in a channel 122 of the receiver 108. Each of the portions of the base 106 can move relative to the splice tray 102. For example, the portions of the base 106 can move along direction 402. The portions of the base 106 can move until the portions of the base 106 meet (e.g., at a center 404 of the splice tray 102). Moving the portions of the base 106 can connect the ferrules 116 of the fiber optic ribbons 110. For example, the fiber optic ribbons 110 can be positioned in the receivers 108 and the two portions of the base 106 can be moved toward the center 404 along direction 402. Movement of the two portions of the base 106 can cause the ferrules 116 to connect.

In various embodiments, the splice tray 102 can include a recess 406 that can aid in the movement of the portions of the base 106. For example, the portions of the base 106 can include projections that are positioned in the recess 406. The projections positioned in the recess 406 can limit movement of the portions of the base 106. For example, the projections positioned in the recess 406 can limit movement of the portions of the base 106 along direction 402.

Figure 5:
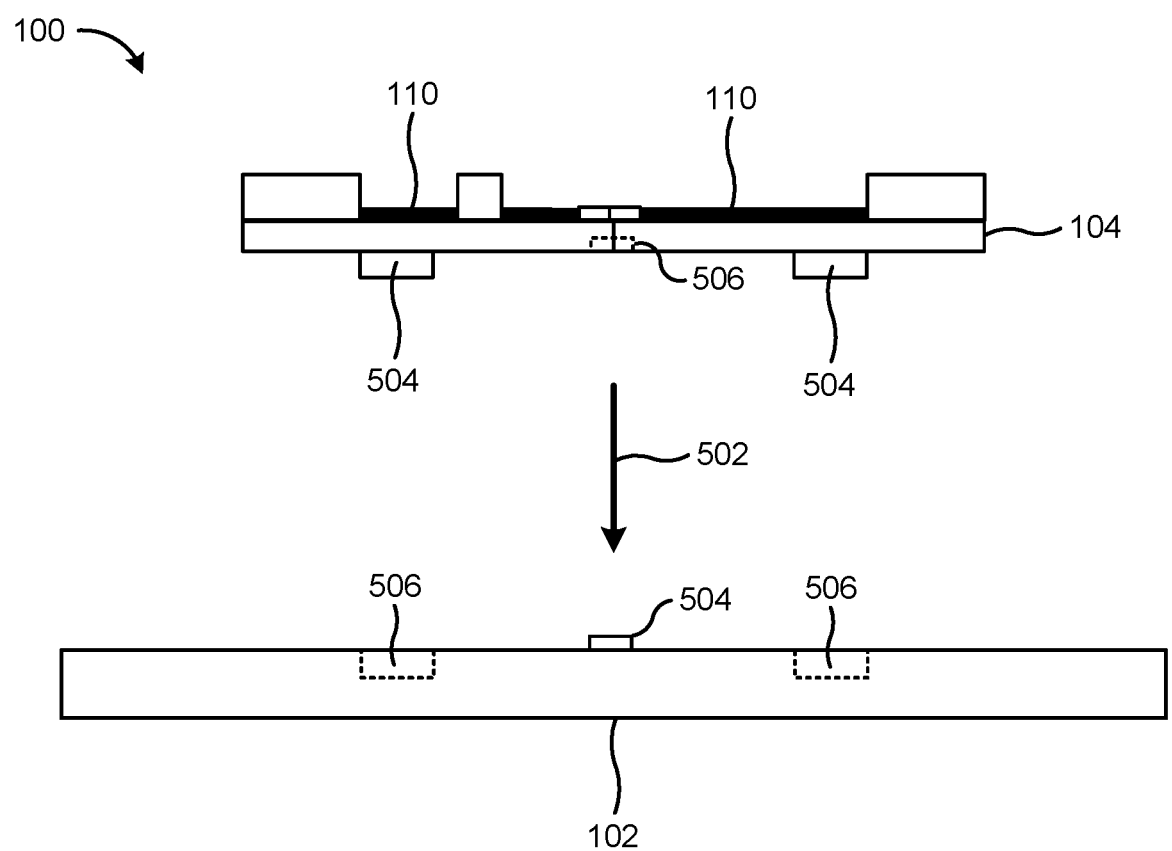
FIG. 5 shows a side view of an additional example fiber optic coupling system, according to various embodiments.

Turning to FIG. 5, an additional example fiber optic coupling system 100 is shown. The fiber optic coupling system 100 can include a fiber optic alignment assembly 104 that can be positioned on a splice tray 102. In various embodiments, fiber optic ribbons 110 can be positioned on the fiber optic alignment assembly 104 and the fiber optic alignment assembly 104 can be positioned on the splice tray 102 (e.g., by moving the fiber optic alignment assembly 104 in direction 502). In further embodiments, the fiber optic alignment assembly 104 can include projections 504. The projections 504 can be positioned in recesses 506 of the splice tray 102. For example, the projections 504 can be positioned in the recesses 506 such that the fiber optic alignment assembly 104 is prevented from moving. Additionally or alternatively, the projections 504 can be included on the splice tray 102 and be positioned in recess 506 of the fiber optic alignment assembly 104.

Figure 6:
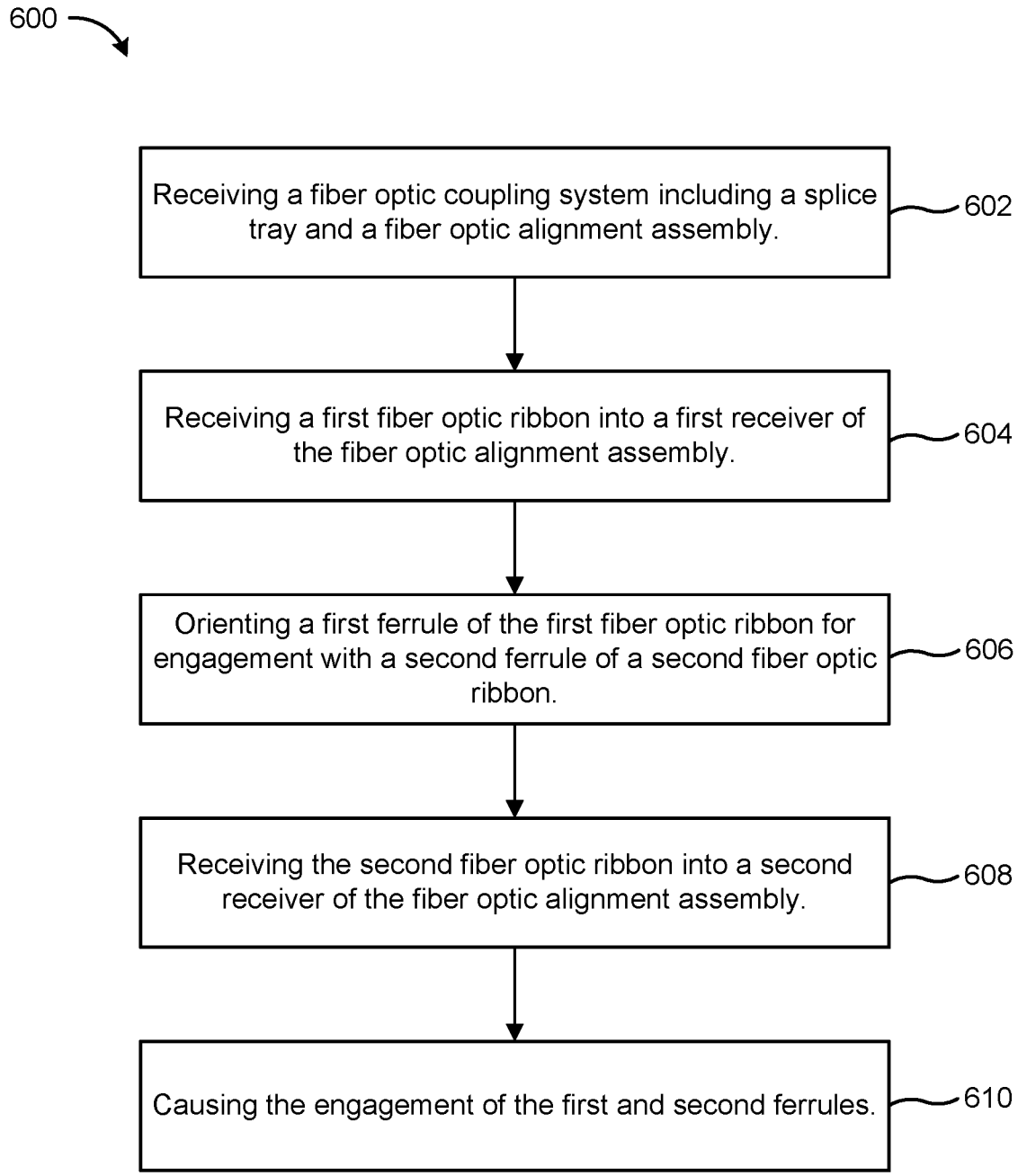
FIG. 6 shows a flowchart illustrating a process for connecting fiber optic ribbons using the fiber optic coupling system of FIG. 1, according to various embodiments.

Turning to FIG. 6, a flowchart illustrating a process 600 for connecting fiber optic ribbons 110 using the fiber optic coupling system 100 is shown. Various blocks of the process 600 are described by referencing the components shown in FIGS. 7A through 9C, however, additional or alternative components may be used with the process 600.

The process 600 at block 602 can include receiving a fiber optic coupling system (e.g., fiber optic coupling system 100). The fiber optic coupling system 100 can include one or more fiber optic alignment assemblies (e.g., fiber optic alignment assembly 104) and a splice tray (e.g., splice tray 102). Receiving the fiber optic coupling system 100 can include an operator receiving the fiber optic coupling system 100. Additionally or alternatively, receive the fiber optic coupling system 100 can include a splice tray 102 receiving one or more fiber optic alignment assemblies 104

As shown in FIGS. 7A and 8A, the fiber optic alignment assemblies 104 can be positioned on the splice tray 102. As shown in FIG. 9A, the fiber optic alignment assembly 104 can be separate from the splice tray 102. The fiber optic alignment assemblies 104 can include first and second receivers 108 positioned on a base 106.

The process 600 at block 604 can include receiving a first fiber optic ribbon (e.g., fiber optic ribbon 110) into a first receiver 108 of the fiber optic alignment assemblies 104. For example, a collet 112 of the fiber optic ribbon 110 can be positioned in a channel 122 of the receiver 108. As shown in FIGS. 7B, 8B, and 9B the fiber optic ribbon 110 can be positioned on one side of the fiber optic alignment assembly 104. For example, the fiber optic ribbon 110 can be positioned on the side of the fiber optic alignment assembly 104 that includes a guide 118.

The process 600 at block 606 can include orienting a first ferrule (e.g., ferrule 116) for engagement with a second ferrule 116 of a second fiber optic ribbon 110. The first ferrule 116 can be oriented with the guide 118. For example, a portion of the terminal segment 114 can contact the guide 118 and orient the first ferrule 116 for engagement with the second ferrule 116. For example, as shown in FIGS. 7B and 8B the terminal segment 114 is engaged with the guide 118 to position the ferrule 116 for engagement with a ferrule 116 of a second fiber optic ribbon 110 (e.g., as shown in FIGS. 7C, 8C, and 9B)

The process 600 at block 608 can include receiving a second fiber optic ribbon 110 into a second receiver 108 of the fiber optic alignment assembly 104. As shown in FIGS. 7C, 8B, and 9B, the second fiber optic ribbon 110 can be positioned in the second receiver 108 such that the first and second ferrules 116 are oriented toward one another.

The process 600 at block 610 can include causing the engagement of the first and second ferrules 116. In various embodiments, positioning the second fiber optic ribbon 110 into the second receiver 108 can cause the engagement of the first and second ferrules 116 (e.g., as shown in FIGS. 7C and 9B). In some embodiments, causing the engagement of the first and second ferrules 116 can include moving portions of the base 106 (e.g., as shown in FIG. 8C).

In some embodiments, the fiber optic ribbons 110 can be positioned on the fiber optic alignment assembly 104 and connected to one another (e.g., via the ferrules 116) when the fiber optic alignment assembly 104 is separate from the splice tray 102 (e.g., as shown in FIG. 9B). The fiber optic alignment assembly 104 with the connected fiber optic ribbons 110 can be positioned on the splice tray 102. For example, projections of the fiber optic alignment assembly 104 can be positioned in recesses 506 of the splice tray 102. In further embodiments, the splice tray 102 can include markings 902 that can aid in positioning of the fiber optic alignment assembly 104 on the splice tray 102. For example, the markings 902 can identify an area where a fiber optic alignment assembly 104 can be inserted.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A fiber optic coupling system comprising:
   a splice tray; and
   a fiber optic alignment assembly coupled with the splice tray, the fiber optic alignment assembly comprising:
      a base;
      a first receiver coupled with the base and defining a first channel for receiving a first collet of a first fiber optic ribbon, the first fiber optic ribbon having a first terminal segment extending from the first collet and terminating with a first ferrule;

a second receiver coupled with the base and defining a second channel for receiving a second collet of a second fiber optic ribbon, the second fiber optic ribbon having a second terminal segment extending from the second collet and terminating with a second ferrule; and a guide coupled with the base and configured to orient the first ferrule such that when the first and second collets are positioned in the respective first and second channels, the first and second ferrules are aligned and connectable in an arrangement in which the first terminal segment of the first fiber optic ribbon and the second terminal segment of the second fiber optic ribbon are each positioned at least partially bent into position to apply a spring force for maintaining engagement of the first and second ferrules.

2. The system of claim 1, wherein the base comprises a first portion and a second portion, wherein the first receiver is coupled with the first portion and the second receiver is coupled with the second portion, the first and second portions being laterally moveable towards one another to couple the first and second ferrules.

3. The system of claim 1, wherein the splice tray and the fiber optic alignment assembly are molded into a single piece.

4. The system of claim 1, wherein the guide causes a portion of the first fiber optic ribbon to bend, and wherein connecting the first and second fiber optic ribbons causes a portion of the second fiber optic ribbon to bend.

5. The system of claim 1, wherein the first terminal segment comprises a first length of fiber optic ribbon extending from the first collet and the second terminal segment comprises a second length of fiber optic ribbon extending from the second collet, the first and second lengths of fiber optic ribbon having the same length.

6. The system of claim 1, wherein the fiber optic alignment assembly is a first fiber optic alignment assembly and the system further comprises a second fiber optic alignment assembly coupled with the splice tray.

7. A method of connecting fiber optic ribbons, the method comprising:

receiving a first collet of a first fiber optic ribbon into a first channel of a first receiver of a fiber optic alignment assembly;

orienting a first ferrule of a first terminal segment of the first fiber optic ribbon for engagement with a second ferrule of a second terminal segment of a second fiber optic ribbon;

receiving a second collet of the second fiber optic ribbon into a second channel of a second receiver of the fiber optic alignment assembly; and with the first collet positioned in the first channel and the second collet positioned in the second channel, causing the engagement of the first and second ferrules in an arrangement in which the first terminal segment of the first fiber optic ribbon and the second terminal segment of the second fiber optic ribbon are each positioned at least partially bent into position for engagement of the first and second ferrules.

8. The method of claim 7, wherein receiving the second collet of the second fiber optic ribbon into the second channel causes the engagement of the first and second ferrules.

9. The method of claim 7, wherein causing the engagement of the first and second ferrules comprises moving the first and second receivers toward one another.

10. The method of claim 7, further comprising coupling the fiber optic alignment assembly with a splice tray.

11. The method of claim 10, wherein the coupling of the fiber optic alignment assembly with the splice tray comprises inserting a projection of one of the fiber optic alignment assembly or the splice tray into a recess of the other of the splice tray or the fiber optic alignment assembly.

12. The method of claim 7, wherein orienting the first ferrule of the first terminal segment comprises engaging a portion of the first terminal segment with a guide so as to cause the first terminal segment to bend.

13. The method of claim 7, wherein receiving the first collet into the first channel comprises inserting the first collet into the first channel along a vertical direction.

14. The method of claim 7, wherein receiving the first collet into the first channel comprises inserting the first collet into the first channel along a lateral direction.

15. A fiber optic alignment assembly, comprising:

a base;

a first receiver coupled with the base, the first receiver defining a first channel for receiving a first collet of a first fiber optic ribbon such that a first ferrule of a first terminal segment of the first fiber optic ribbon is positioned for engagement;

a second receiver coupled with the base, the second receiver defining a second channel for receiving a second collet of a second fiber optic ribbon such that a second ferrule of a second terminal segment of the second fiber optic ribbon is positioned for engagement with the first ferrule; and a guide coupled with the base, the guide configured to orient the first fiber optic ribbon such that, when the first and second ferrules are engaged, the first fiber optic ribbon applies a first force to keep the first ferrule engaged with the second ferrule in an arrangement in which the first terminal segment of the first fiber optic ribbon and the second terminal segment of the second fiber optic ribbon are each positioned at least partially bent into position for engagement of the first and second ferrules.

16. The fiber optic alignment assembly of claim 15, wherein the first receiver is coupled to a first portion of the base, and wherein the second receiver is coupled to a second portion of the base, the first and second portions of the base being laterally moveable towards one another.

17. The fiber optic alignment assembly of claim 15, wherein engagement of the first and second ferrules causes the second fiber optic ribbon to bend and apply a second force to keep the second ferrule engaged with the first ferrule.

18. The fiber optic alignment assembly of claim 15, further comprising protrusions extending from one of the base or a splice tray, the protrusions positionable in recesses of the other of the base or the splice tray.

19. The fiber optic alignment assembly of claim 15, wherein the first collet is coupled with optical fibers positioned within the first fiber optic ribbon.

20. The fiber optic alignment assembly of claim 15, wherein the first ferrule comprises one or more optical interface points through which light can travel, each of the optical interface points coupled with an optical fiber positioned within the first fiber optic ribbon.

* * * * *